(12) United States Patent
Müller et al.

(10) Patent No.: US 6,370,863 B2
(45) Date of Patent: *Apr. 16, 2002

(54) METHOD OF OPERATING A GAS-TURBINE CHAMBER WITH GASEOUS FUEL

(75) Inventors: Gerhard Müller, Germering; Frank Reiss, Lauchringen, both of (DE); Pirmin Schiessel, Unterehrendingen; Stefan Tschirren, Nunningen, both of (CH)

(73) Assignee: Asea Brown Boveri AG, Baden (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/349,966

(22) Filed: Jul. 9, 1999

(30) Foreign Application Priority Data

Jul. 27, 1998 (EP) ............................................. 98810723

(51) Int. Cl.[7] ................................................... F02E 7/26
(52) U.S. Cl. ....................................................... 60/39.06
(58) Field of Search ............................... 60/39.06, 746, 60/747, 737

(56) References Cited

U.S. PATENT DOCUMENTS

| 4,100,733 | A |   | 7/1978  | Striebel et al. |        |
|-----------|---|---|---------|-----------------|--------|
| 5,303,542 | A |   | 4/1994  | Hoffa           |        |
| 5,373,695 | A |   | 12/1994 | Aigner et al.   |        |
| 5,402,634 | A |   | 4/1995  | Marshall        |        |
| 5,660,045 | A | * | 8/1997  | Ito             | 60/737 |
| 5,699,667 | A | * | 12/1997 | Joos            | 60/737 |
| 6,098,406 | A | * | 8/2000  | Bolis           | 60/737 |

FOREIGN PATENT DOCUMENTS

| EP | 0 597 137 B1 | 5/1994  |
| EP | 0 597 138 B1 | 5/1994  |
| EP | 0802310 A2   | 10/1997 |

* cited by examiner

Primary Examiner—Charles G. Freay
Assistant Examiner—Ehud Gartenberg
(74) Attorney, Agent, or Firm—Burns, Doane, Swecker & Mathis, L.L.P.

(57) ABSTRACT

In a method of operating a gas turbine, in which a gaseous fuel is burned in a combustion chamber and the hot combustion gases which are produced in the process are directed through the gas turbine, and in which method the gaseous fuel is fed to the combustion chamber via a plurality of controllable burners, working in parallel and arranged on one or more concentric, essentially circular rings, and is sprayed into the combustion chamber via fuel holes, high safety and availability within various operating ranges is achieved in a simple manner owing to the fact that the burners are divided into at least two groups (40–42) of burners, these groups in each case include the burners of one of the rings, and these groups are individually activated as a function of the operating state of the gas turbine.

8 Claims, 4 Drawing Sheets

METHOD OF OPERATING A GAS-TURBINE CHAMBER WITH GASEOUS FUEL

BACKGROUND OF THE INVENTION

1. Field of the Invention

The present invention relates to the field of gas turbines. It relates to a method of operating a gas turbine, in which a gaseous fuel is burned in a combustion chamber and the hot combustion gases which are produced in the process are directed through the gas turbine, and in which method the gaseous fuel is fed to the combustion chamber via a plurality of controllable burners, working in parallel and arranged on one or more concentric, essentially circular rings, and is sprayed into the combustion chamber via fuel holes.

2. Discussion of Background

Gas turbines are being increasingly equipped with multiple burners having a leaner premix technique. In this case, the fuel and the combustion air is premixed as uniformly as possible and is only then fed to the flame. If this is carried out with high excess air, relatively low flame temperatures and thus low nitrogen-oxide formation result.

In accordance with the geometry of gas turbines, the majority of burners are often arranged in an annular shape in the form of annular combustion chambers. EP-0 597 137 B1 and EP-0 597 138 B1, for example, have disclosed such annular combustion chambers. In this case, the liquid or gaseous fuels are fed via fuel-feed rings to the burners arranged in multiple rings, where they are sprayed into the annular combustion chamber and burned. Likewise, the water feed to the burners is ensured via water rings, which are arranged next to the fuel-feed rings.

When gaseous fuel is used, different operating modes of the individual burners may be more or less advantageous depending on the type of loading state, the number of burners in operation, the emission values or similar characteristic quantities of the gas turbine. In the case of double-cone burners, the gaseous fuel, for example in the so-called pilot mode, may be admixed to the combustion air in the center at the base of the double-cone burner through the so-called pilot-gas holes. The burners run in this way are distinguished by a very stable flame with high flame temperature, although this is a factor which also entails disadvantageous emission values. On the other hand, in the so-called premix mode, the gaseous fuel, in double-cone burners, is admixed laterally to the combustion air in the cone region through the premix-gas holes. The flames of burners in the premix mode are distinguished by a low flame temperature and the advantageous emission values associated therewith, but are substantially less stable than burners operated in the pilot mode. A double-cone burner may in principle be constructed in such a way that both of the above operating modes may be run, in succession and in parallel, and the gaseous fuel is accordingly sprayed in through the one or the other set of holes.

If a gas turbine of the type mentioned at the beginning is run up from idling to load operation, undesirable effects often occur. Inter alia, pronounced development of smoke and nitrogen oxide is possible in certain phases of the run-up and at part-load operation, burners may be extinguished, and disadvantageous pulsating of the gas turbine may also occur.

SUMMARY OF THE INVENTION

Accordingly, one object of the invention is to provide a novel method and a novel apparatus with which both run-up and part-load operation of a gas turbine operated with gaseous fuel is possible in a reliable, uncomplicated and low-pollution manner.

This object is achieved in a method of the type mentioned at the beginning in that the burners are divided into at least two groups of burners, these groups in each case comprise the burners of one of the rings, and these groups are individually activated as a function of the operating state of the gas turbine. By the use according to the invention of burner groups which can be activated individually with gaseous fuel, the conditions in the combustion chamber can be adapted in an optimum manner to the operating state of the gas turbine, a factor which makes possible run-up and part-load operation under controlled combustion and flow conditions in the gas turbine.

A first preferred embodiment of the method according to the invention is distinguished by the fact that the burners of the gas turbines are ignited and/or started up one after the other in at least two phases, i.e. they are supplied with gaseous fuel. In this case, the start-up is advantageously effected as a function of the speed of the gas turbine, of the load applied to the gas turbine, or of the flue gases emitted by the gas turbine. In addition, the feed of gaseous fuel may be designed to be variable likewise as a function of the abovementioned characteristic quantities. In this way, depending on the basic conditions, an optimum combustion behavior of the annular combustion chamber can be set in a simple manner.

A preferred development of this embodiment is distinguished by the fact that the abovementioned groups, in their arrangement, differ at least partly in their operating mode, i.e. that certain burners are operated in several different operating modes. In particular, division into premix mode and pilot mode permits an extremely suitable setting of the combustion behavior in the annular combustion chamber, and this setting allows the compromise between the prevention of the formation of smoke and nitrogen oxide and flames which are nonetheless stable and safe from extinction to be regulated in an optimum manner.

If the gas turbine is run up from idling to load or part-load operation, the groups are preferably started up one after the other in different phases of the run-up. In this case, the limits between the different phases are again preferably determined as a function of the speed of the gas turbine, the load applied to the gas turbine, and/or as a function of the emissions given off by the gas turbine.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
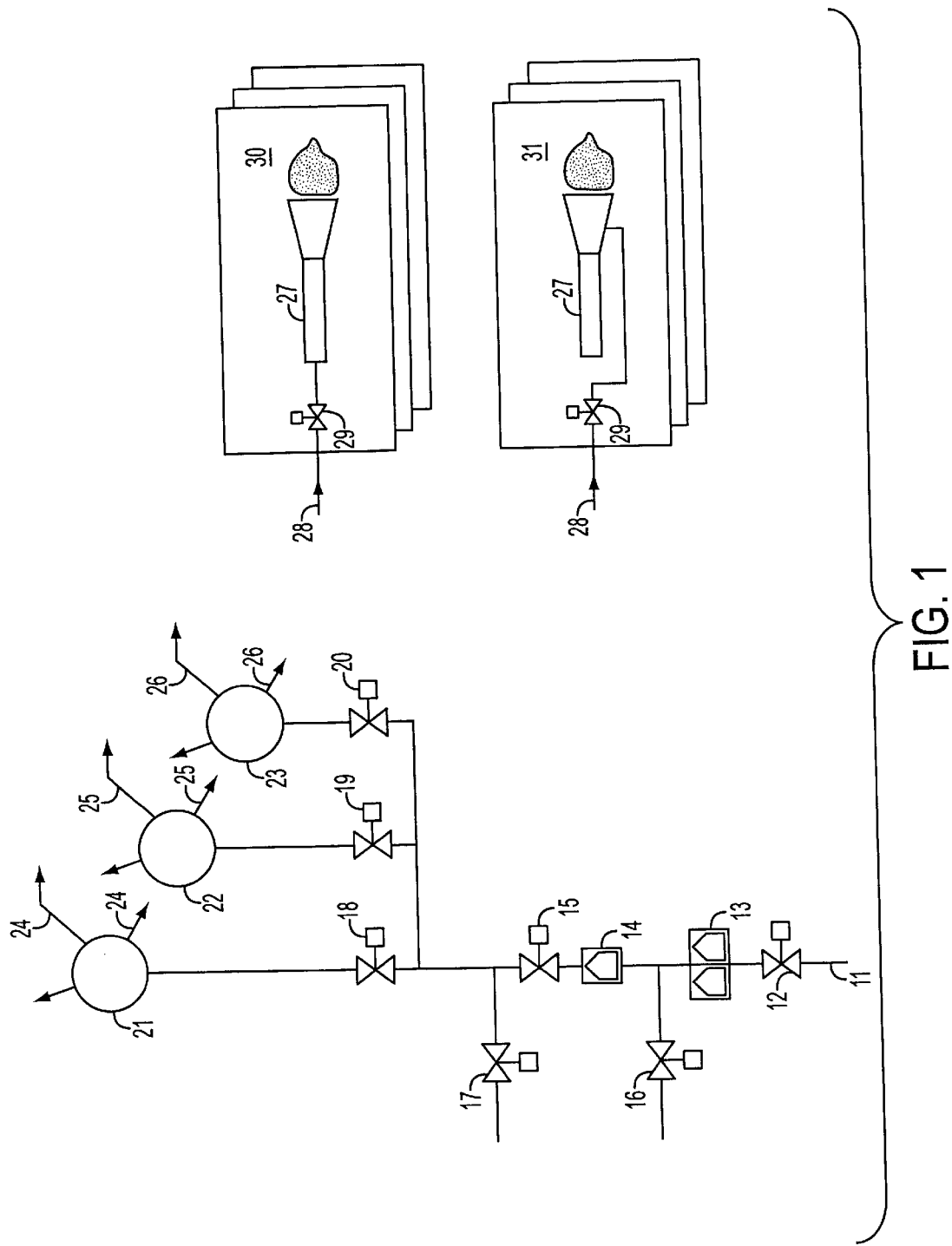
FIG. 1 shows a schematic representation of fuel system and burner.

Referring now to the drawings, wherein like reference numerals designate identical or corresponding parts throughout the several views, FIG. 1 indicates a schematic representation of the activation according to the invention of an annular combustion chamber. Such activation is possible, for example, in the GT 13E2 gas turbine from ABB having the known EV17 burner from ABB. The gaseous fuel is fed to the burner system via the feeder line 11, in which case the feed may be controlled by a main shut-off valve 12. The fuel is first cleaned in a filter 13 and then with a screen 14 and then enters regions close to the burners in a controllable manner via a quick shut-off valve 15. In accordance with the division of the burner groups 40–42, the burner line is then divided into fuel-feed rings 21–23, which can be activated individually via control valves 18–20. The fuel-feed rings 21–23 have fuel-feed-ring outlets 24–26, via which the burners 27 of the respective group 40–42 are supplied with the gaseous fuel through lines 28. Depending on the mode of operation 30, 31 of the burners 27 of the group 40–42 considered, the burners 27 are activated differently. If a burner 27 is operated in pilot mode 30, the fuel first flows through a burner valve 29 and is then sprayed in centrally through the pilot-gas holes directly at the base of the cone burner 27. On the other hand, if a burner 27 is operated in the premix mode 31, the gaseous fuel is sprayed downstream of the burner valve 29 in the cone region through the premix-gas holes into the combustion-air flow.

Figure 2:
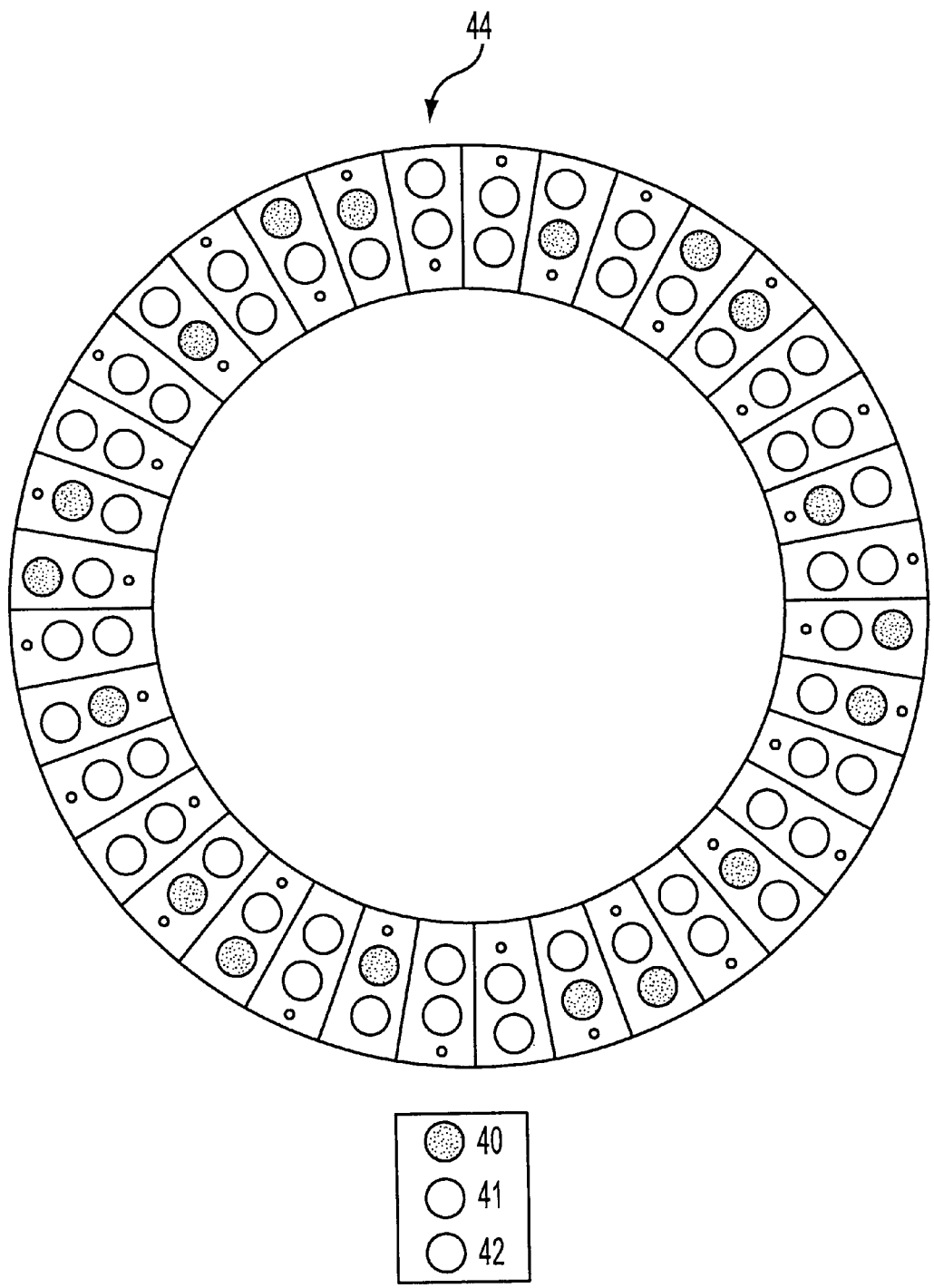
FIG. 2 shows a schematic representation of the annular combustion chamber in a view against the direction of the gas flow.

FIG. 2 shows a section through the annular combustion chamber with the division of the burner groups 40–42, against the direction of the gas flow. The three groups 40–42 of 72 burners are identified by appropriate marking. Solid circles designate the 18 burners 27 of the ¼ (of the total number of burners) premix burner group 40, empty circles designate the 54 burners which, if operated in the premix mode 31, make up the ¾ (of the total number of burners) premix burner group 41 and, if operated in the pilot mode 30, form the ¾ (of the total number of burners) internally piloted burner group 42. In other words, the two groups 41 and 42 are formed by the same burners, and the two groups differ only in the type of activation of the burners 27, as shown in FIG. 1.

Figure 3:
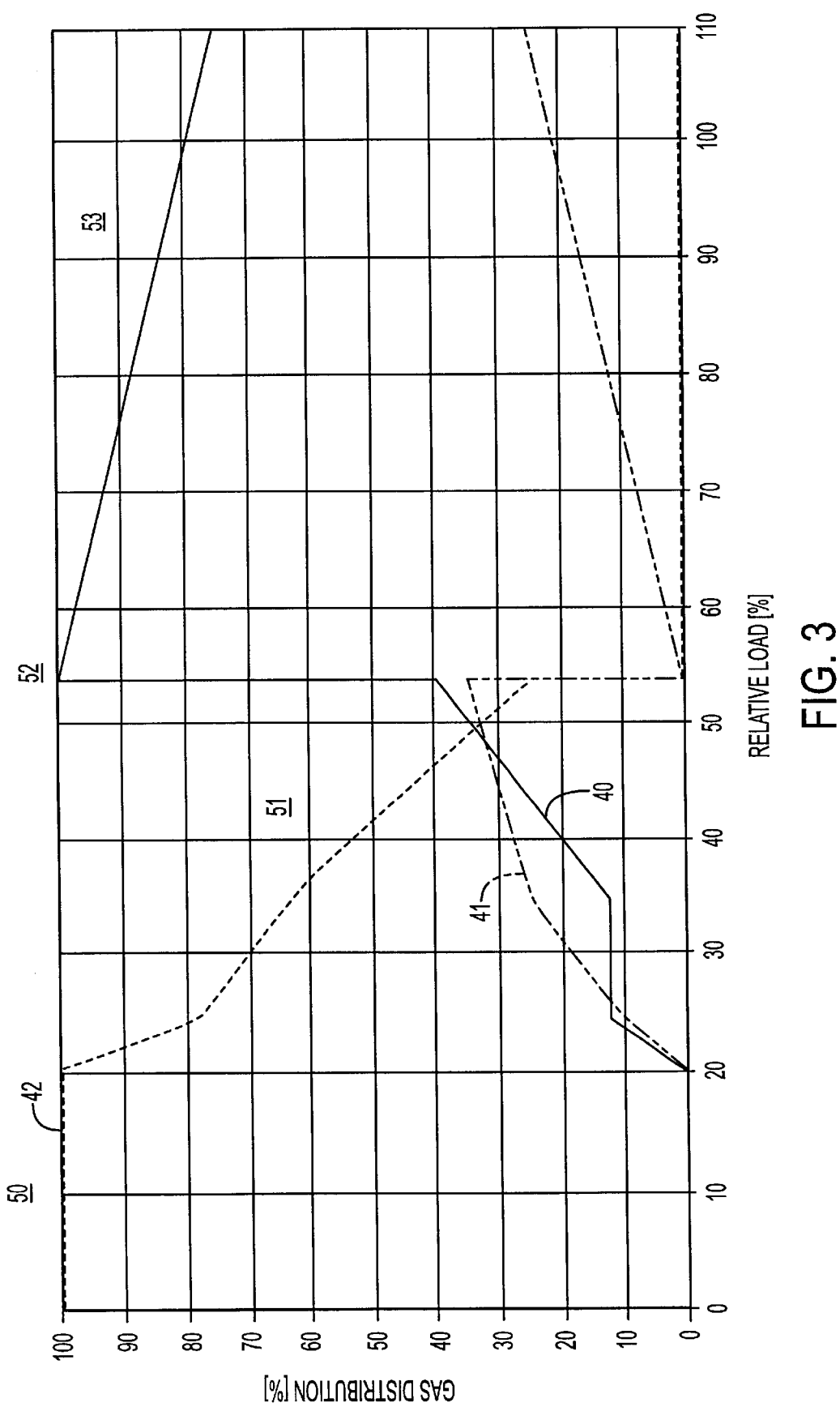
FIG. 3 shows a representation of the relative fuel distribution to the three burner rings in percentage (ordinate) as a function of the load (abscissa) applied to the gas turbine in percentage relative to the full load.

FIG. 3 shows the gas distribution in % to the respective burner groups as a function of the load applied to the gas turbine in percentage relative to the full load during run-up from idling operation to full load (100%) or even to overload operation (>100%).

The run-up of the gas turbine from shutdown to idling operation is simple when using gaseous fuel. In this case, the gas turbine is accelerated externally to about 600 rpm; at this speed, the fuel is sprayed in as a function of the turbine outlet temperature and is then ignited. In the process, only the 54 burners of the ¾ internally piloted burner group 42 are used. In this case, typical gas flows of 600–700 gr/s are advantageous for the gas turbine specified above.

In the first phase 50 of the run-up from idling to full-load operation of the gas turbine, the operation is the same as during the run-up to idling, i.e. only the 54 burners of the ¾ internally piloted burner group 42 are used and simply increasingly supplied with gaseous fuel. The stability of the flames within the low load range is thus ensured.

Figure 4:
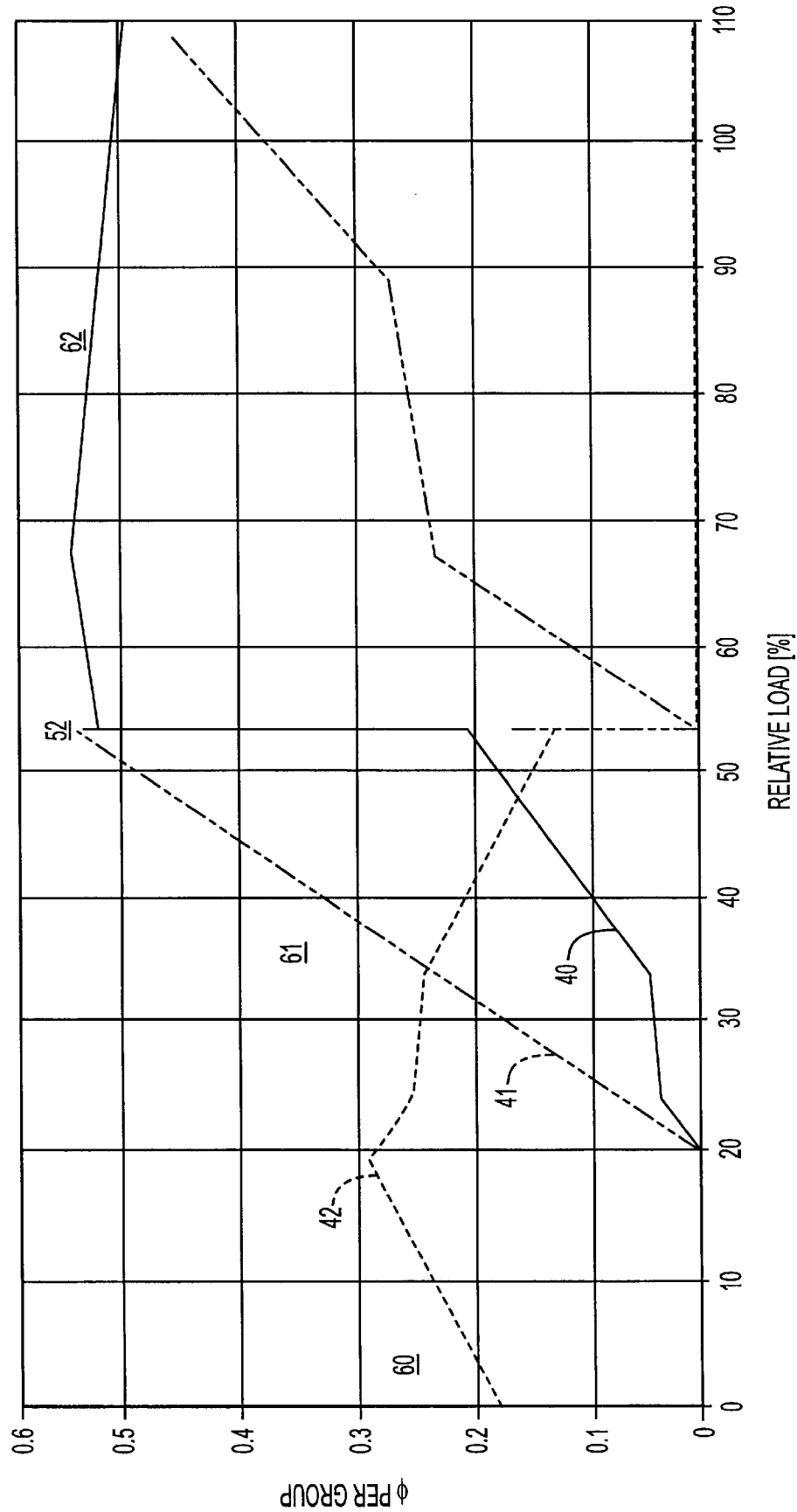
FIG. 4 shows a representation of the fuel/air ratio 0 (ordinate) as a function of the load (abscissa) measured relative to the full load and applied to the gas turbine.

At about 20% load the other two groups 40 and 41 are now started up. Thus all three groups 40–42 are active in the second phase 51, which means that the burners of groups 41 and 42 run in parallel in both operating modes. The gas feeding of the three groups is different in the second phase 51. The ¾ internally piloted group 42 is continuously activated with less gaseous fuel, and, at the changeover point 52, i.e. preferably at around 50% load, only about 25% of the entire gas flow is fed to the ¾ internally piloted group 42. On the other hand, the premix burner groups 40 and 41 are correspondingly activated with increasing gas quantity. The ¾ premix burner group 41 ends at the changeover point 52 with a relative gas quantity of about 40%, i.e. the fuel feed to the burners of groups 41 and 42 is increasingly displaced from the internally piloted operating mode to the premix activation. In the second phase 51, the ¼ premix burner group 40 is also additionally started up, specifically in a substantially more intensive manner than that of the ¾ premix burner group 41. This is because, at the changeover point 52, about 36% of the fuel quantity is fed to the burners of the ¼ premix burner group 40, of which there are only 18, i.e. this burner group is operated on a very rich mixture. This can also be seen in particular from FIG. 4, where the fuel-to-air ratio Ø is plotted as a function of the load applied to the gas turbine. In the first phase 60, the burners of the ¾ internally piloted burner group 42 are activated on a fairly lean but increasing mixture Ø increases from about 0.18 to 0.3); in the second phase 61, however, the mixture density up to the changeover point 52 decreases again to about 0.13. In the second phase 61, the premix burner groups are started up but are supplied with fuel to a very different extent. Within this range, the ¾ premix burner group 41 is run up on a relatively lean mixture to a value of about Ø=0.2 at the changeover point 52, whereas the 18 burners of the 1/4 premix burner group 40 are run on a relatively rich mixture to about Ø=0.55 at the changeover point 52 (in the case of the abovementioned special burners about 2.2 kg/s of fuel gas is fed into the burners of the ¼ premix burner group 40). This combination of internally piloted burners (group 42) and externally piloted burners of group 40 (group 40 is externally piloted, as it were, by the burners of group 41) is the basis for optimized emissions of nitrogen oxide within this load range of about 20–50% without the disadvantages of extinction.

At the changeover point 52, the gas flows are shifted to a great extent with the use of a certain logic circuit. The ¾ internally piloted burner group 42 and the ¼ premix burner group 40 are completely shut down, while the ¾ premix burner group 41 is run up in a controlled manner to rich operation. During the run-up, all the valves are operated simultaneously at preferably around 53.5% relative load. Since the fuel gas pressure in the lines to the ¾ internally piloted burner group 42 is so high, so much fuel still flows internally into the burners immediately after the closing of the valves that the risk of extinction during this control process, which is abrupt per se, is very low. During reduction in output, however, a different procedure has to be used in order to effectively prevent extinction; at around 53% relative load, the fuel supply to the ¾ premix burner group 41 is first throttled back when the gas flow in the lines to the ¾ internally piloted burner group 42 has reached a sufficient value (this is about 0.72 kg/s in the case of the burners specified above). During reduction in output, the ¼ premix burner group 40 is supplied with fuel when the gas flow of the ¾ internally piloted burner group has already assumed a certain value (more than 0.12 kg/s for 0.05 s in the above example).

In the third phase 53, 62 above the changeover point 52, all the burners run in the premix mode 31. only groups 40 and 41 are active. During increasing load, the ¼ premix burner group 40 is increasingly supplied with gaseous fuel above the changeover point, while the ¾ premix burner group 41 is rather reduced in output somewhat. In general, however, at average load above the changeover point 52, the ¾ premix burner group 41 is run on a rich mixture and the ¼ premix burner group 40 is rather run on a lean mixture (see FIG. 4). At full load and in particular within the overload range (>100%), however, the mixture densities are then very similar and values of Ø of about 0.5 apply to both groups 40 and 41.

Within the range between the changeover point 52 and full load (100%), the fuel-to-air ratio Ø is the most important parameter which is relevant for the emissions of nitrogen oxide. However, in order to continue to optimize the discharge of nitrogen oxide from the gas turbine, it is advantageous, in addition to varying the value of Ø, to also vary the ratio between the 54 burners of the ¾ premix burner group 41 (here the main premix burner group) and the ¼ premix burner group (here the externally piloted premix burner group). In this way, it is possible to achieve fine setting of the emissions of nitrogen oxide and the flame stability; in particular, it is possible to react to changes in the gas-turbine hardware, to the ambient conditions or to quick changes in the load applied to the gas turbine.

In other words, If the gas turbine is running at full load (100%), the emission of nitrogen oxide may be optimally set via the fuel-activation ratio of the two groups 40 and 41. For homogeneous operation, in particular ratios of ¼ (group 40) to ¾ (group 41) of 0.1 to 0.25 are optimal.

In practice, the behavior during rapid load fluctuations is especially important for the operation of a gas turbine. Precisely at steep load gradients, there is in particular the risk of the burners being extinguished. Within the load range below the changeover point 52, this risk is reduced by at least some of the burners (group 42) being run in the stable, internally piloted operating mode. Above the changeover point 52, it is possible to react to rapid load fluctuations in such a way that the ¾ premix burner group 41 is run on a richer mixture and supplied with a considerable amount of fuel, while the ¼ premix burner group 40 is reduced in output to a leaner operation. This leads to stable flames which are not extinguished. It is therefore clear that, in particular within the load range substantially above the changeover point, this adaptation may be used ever more effectively, since the ¼ premix burner group 40 there is supplied with a considerable fuel quantity. In order to react to rapid load fluctuations in the load applied to the gas turbine even within the range just above the changeover point 52, slight throttling-back may be effected via the VIGV (variable inlet guide vane) with the air flowing into the burners, which likewise leads to a richer fuel-to-air ratio and thus to more stable burner flames.

In summary, this complicated control of the runup is advantageous for the following reasons:

Within all the load ranges, the burners of the gas turbine can be set so as to be stable and safe from extinction.

Due to the mutual adjustability of different groups, which is possible within all load ranges, the emission of nitrogen oxide can be kept at an optimum level and can be controlled.

The division of the groups and the different operating modes permit flexible reaction to rapid load fluctuations, which further stabilizes the operation of the gas turbine.

The operating concept is simple and reliable.

High availability due to controlled run-up and controlled reduction in output.

Numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method of operating a gas turbine, in which a gaseous fuel is burned in a combustion chamber and the hot combustion gases which are produced in the process are directed through the gas turbine, comprising the steps of:

feeding gaseous fuel to the combustion chamber through a plurality of controllable burners fluidly arranged in parallel and in a plurality of segments arranged angularly inside the combustion chamber, each segment including a radially inner burner and a radially outer burner, each burner being operable in a mode selected from the group consisting of a premix mode in which the fuel is injected laterally into the burner through premix holes, a pilot mode in which the fuel is injected into the burner through a central pilot hole, and both;

wherein the plurality of burners are fluidly arranged into at least two groups of burners, each of the burners of each segment being a member of at least one of the at least two groups of burners; and individually actuating a group of burners as a function of the operating state of the gas turbine;

wherein a first group comprises less than half the total number of burners, and the burners of this first group are operated in the premix mode, and wherein a second group is formed by the rest of the burners of the combustion chamber, and the burners of this second group are operated in the premix mode, and wherein a third group is formed by the burners of the second group, and wherein the burners of the third group are operated in the pilot mode.

2. The method as claimed in claim 1, wherein the combustion chamber contains a total of 72 burner, wherein the first group comprises 18 burners which are distributed essentially uniformly all round in the segments, and the second and third groups together comprise the remaining 54 burners.

3. The method as claimed in claim 2, wherein, during the run-up from the no-load idling operation to the load operation of the gas turbine, only the third group is active in a first phase between 0 and 20% relative load, and the third group is increasingly supplied with fuel during increasing load, wherein all three groups are active in a second phase up to a changeover point between 20% and 53.5% load, and wherein the second phase, the third group is supplied with fuel to a decreasing extent during increasing load and the first group and the second group are increasingly supplied with fuel and the first group is run on a richer mixture than the second group, and wherein the third group is completely shut down in a third phase above the changeover point of 53.5%, and the first group is run on a first mixture and the second group is run on a second mixture, the second mixture being richer than the first mixture, and wherein the first group is supplied with a richer fuel mixture and the second group is supplied with a leaner fuel mixture in the third phase during increasing load.

4. The method as claimed in claim 1, further comprising a step selected from the group consisting of:

igniting the at least two groups of burners during a run-up of the gas turbine from a no-load idling operation to a full-load operation in at least two phases;

starting up the at least two groups of burners one after the other in at least two phases; and both.

5. The method as claimed in claim 4, wherein the step of igniting, the step of starting up, or both is performed as a function of a parameter selected from the group consisting of the speed of the gas turbine, the load applied to the as turbine, the emissions given off by the gas turbine, and combination thereof.

6. The method as claimed in claim 4, wherein the step of feeding gaseous fuel to the burners comprises feeding fuel to the burners of the individual groups in the different phases as a function of a parameter selected from the group consisting of the speed of the gas turbine, the load applied to the gas turbine, the emissions given off by he gas turbine, and combinations thereof.

7. The method as claimed in claim 1, wherein the step of individually actuating a group of burners comprises actuating only burners in the pilot mode within a lower load range, actuating burners in both the pilot mode and the premix mode within a moderate load range, and actuating only burners in the premix mode within a top load range.

8. The method as claimed in claim 7, further comprising:

externally piloting burners operated in the premix mode which are operated on a first mixture, by burners in the premix mode which are operated on a second mixture within the top load range, the first mixture being lean relative to the second mixture.

* * * * *